United States Patent [19]

Inoue et al.

[11] Patent Number: 5,982,380
[45] Date of Patent: Nov. 9, 1999

[54] HARDWARE CLIPPING DEVICE WHICH COMPARES OBJECTS WITH BOUNDARIES VIA USE OF ABSOLUTE VALUES

[75] Inventors: Yoshitsugu Inoue; Junko Kobara; Hiroyuki Kawai; Hiroyasu Negishi, all of Tokyo, Japan

[73] Assignee: Mitsubishi Denki Kabushiki Kaisha, Tokyo, Japan

[21] Appl. No.: 08/929,438

[22] Filed: Sep. 16, 1997

[30] Foreign Application Priority Data

Apr. 21, 1997 [JP] Japan ................................. 9-103061

[51] Int. Cl.$^6$ ....................................... G06F 15/30
[52] U.S. Cl. ............................................ 345/434
[58] Field of Search ............................. 345/434

[56] References Cited

U.S. PATENT DOCUMENTS

| | | | |
|---|---|---|---|
| 3,889,107 | 6/1975 | Sutherland | 345/434 |
| 4,412,296 | 10/1983 | Taylor | 345/434 |
| 4,823,282 | 4/1989 | Yamagami | 345/434 |
| 5,157,764 | 10/1992 | Priem et al. | 345/434 |
| 5,414,524 | 5/1995 | Payson et al. | 345/434 |
| 5,720,019 | 2/1998 | Koss et al. | 345/434 |

FOREIGN PATENT DOCUMENTS 2-144779   6/1990   Japan .

OTHER PUBLICATIONS

James D. Foley et al., "Clipping Against a Canonical View Volume in 3D," *Computer Graphics: Principles and Practice*, Second Edition, Addison–Wesley Publishing Company, Reading, Massachusetts, pp. 271–274, Nov. 1992.

James H. Clark, "The Geometry Engine: A VLSI Geometry System for Graphics," *Computer Graphics*, vol. 16, No. 3, Jul. 1982, pp. 127–133.

"Clipping Against a Canonical View Volume in 3D," *Computer Graphics: Principles and Practice*, Second Edition, pp. 271–274.

*Primary Examiner*—Mark R. Powell
*Assistant Examiner*—Jeffrey Allen Rossi
*Attorney, Agent, or Firm*—Burns, Doane, Swecker & Mathis, LLP

[57] ABSTRACT

It is judged that a vertex exists within a view volume when values stored in registers (231 to 236) are all "1". In other words, whether the vertex exists within or beyond the view volume can be judged by whether the values stored in the registers (231 to 236) are all "1" or not. To meet this requirement, a clip code generation/judgment unit (20) comprises a 6-input AND gate (24) which obtains a logical product of the values stored in the registers (231 to 236) to output a judgment signal (M1). With this configuration, a first step for clipping, i.e., the judgment on whether a primitive exists within or beyond a view volume is implemented in hardware, and thereby the operating speed is improved.

17 Claims, 10 Drawing Sheets

HARDWARE CLIPPING DEVICE WHICH COMPARES OBJECTS WITH BOUNDARIES VIA USE OF ABSOLUTE VALUES

BACKGROUND OF THE INVENTION

1. Field of the Invention

The present invention relates to clipping of a basic geometry (referred to as "primitive" hereinafter) of an object to be displayed in a graphics system.

2. Description of the Background Art

In a graphics system, displaying an object needs clipping. The clipping refers to a processing for displaying only a portion of the primitive of an object to be displayed that exists within the four sides of a display window in a 2D (two-dimensional) graphics system, for example. Further, in a 3D (three-dimensional) graphics system, for example, only a portion of the primitive that exists within a view volume of rectangular solid or frustum of pyramid constituted of planes in accordance with the distance from a point of view.

Figure 13:
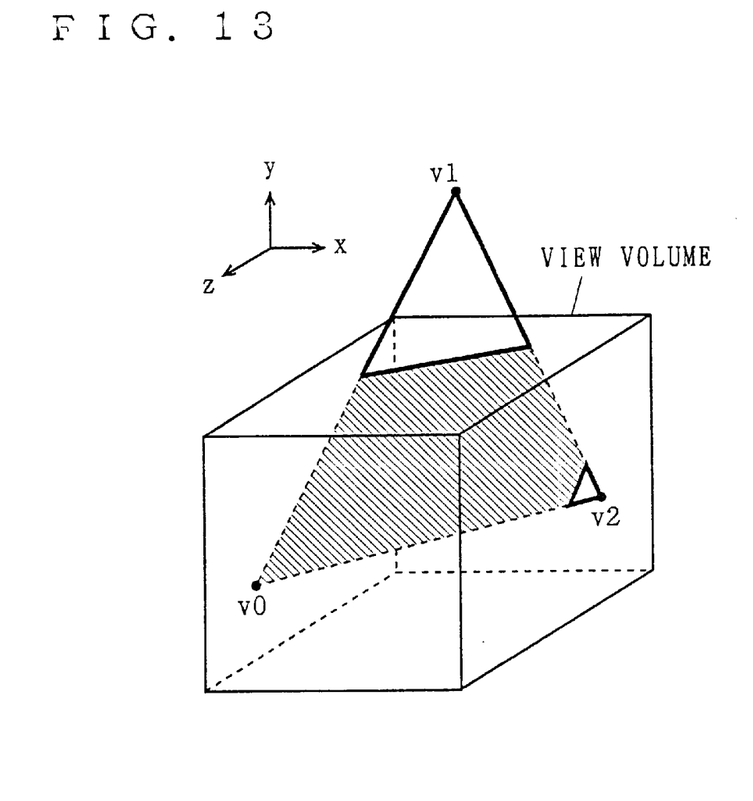
FIGS. 13 to 16 are conceptional views of clipping.
Figure 14:
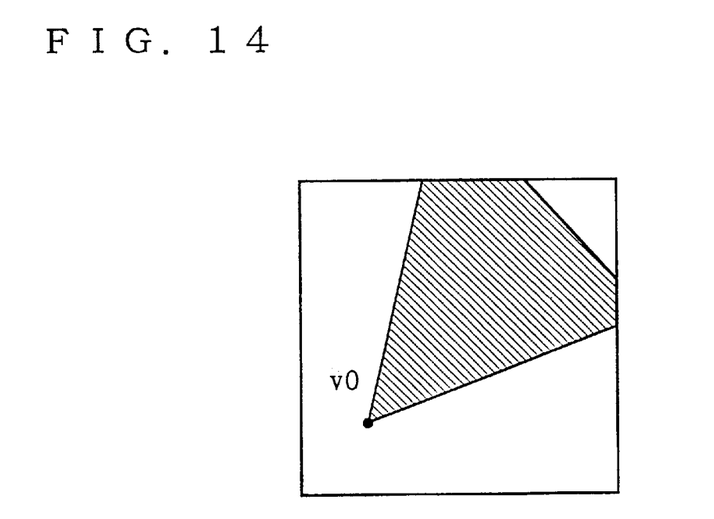

FIG. 13 illustrates a concept of clipping in 3D graphics display, presenting a triangle having three vertices V0, V1 and V2. In the graphics, the primitive may be vertices V0, V1 and V2, lines V0V1, V1V2 and V2V0, or a polygon V1V2V0. These cases will be referred to as where the primitive is vertex, line or polygon, respectively, in the following discussion. FIG. 14 illustrates graphics displayed in a window after clipping.

The clipping process includes a first step of judging whether a primitive exists within or beyond a window or a view volume, a second step of detecting points of intersection between the primitive and planes constituting the window or the view volume when the result of the first step indicates "beyond" and a third step of cutting a portion of the primitive which is out of the window or the view volume.

Figure 15:
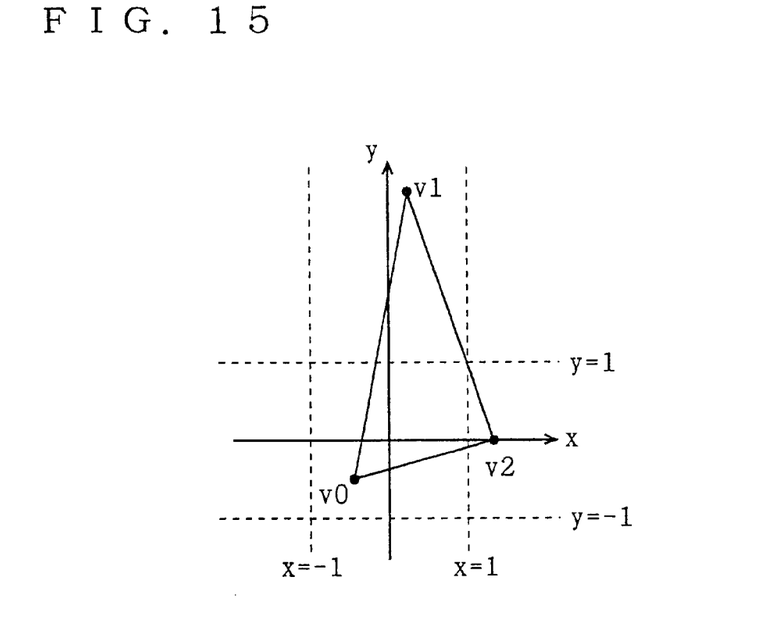
Figure 16:
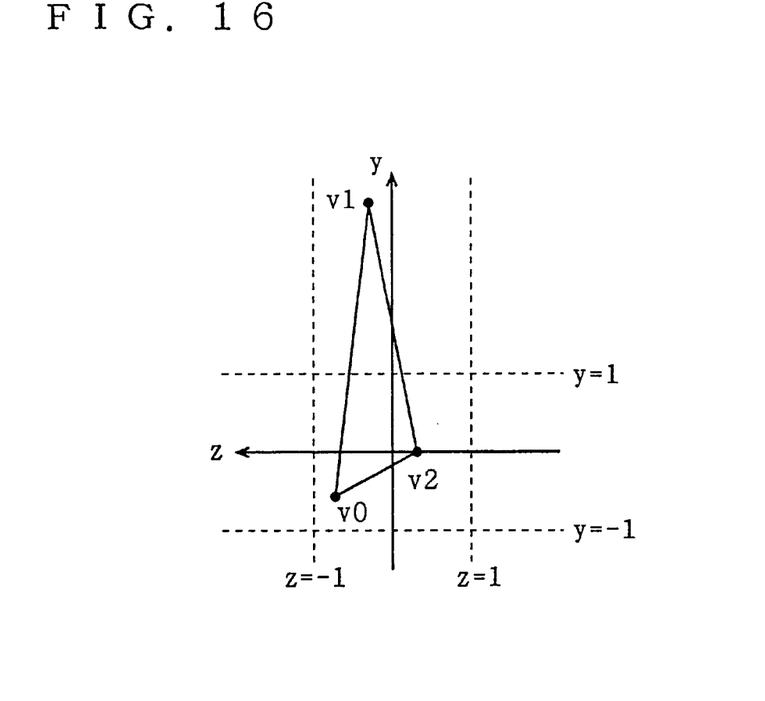

With reference to FIGS. 15 and 16, the first step will be discussed, taking a case of rectangular-solid view volume as an example. These figures show a view volume constituted of six planes of $x=-1$, $x=1$, $y=-1$, $y=1$, $z=-1$ and $z=1$.

When the primitive is vertex, the coordinate of each vertex is compared with the values representing the six planes. As the result of comparison, a clip code is obtained, which represents whether a vertex is within or beyond the view volume as e.g., "1" or "0", respectively. Since the view volume has six planes, judgment on whether the noted vertex is within or beyond the view volume needs a clip code of 6 bits. Accordingly, if the 6 bits of the clip code are all "1", the vertex is judged to be within the view volume. In accordance with FIGS. 13 to 16, the clip codes relating to the vertices and the six planes are shown in Table 1. It can be seen from Table 1 that only the vertex V0 is within the view volume and the other vertices V1 and V2 are beyond the view volume.

TABLE 1

|    | x = 1 | x = -1 | y = 1 | y = -1 | z = 1 | Z = -1 |
|----|-------|--------|-------|--------|-------|--------|
| V0 | 1     | 1      | 1     | 1      | 1     | 1      |
| V1 | 1     | 1      | 0     | 1      | 1     | 1      |
| V2 | 0     | 1      | 1     | 1      | 1     | 1      |

When the primitive is line, each of endpoints (initial point and terminal point) needs the clip code of 6 bits. As to a line, if 12 bits of the clip code are all "1", the line is judged to be within the view volume. If any one of the 12 bits of the clip code is "0", the second step is performed, referring to the clip code, to detect the point of intersection between the line and the view volume.

When the primitive is polygon, the polygon is divided into triangles (hereinafter the primitive is triangle in a case of polygon) before the clipping. If 18 bits of the clip code relating to the three vertices of the triangle are all "1", the polygon is judged to be within the view volume. If any one of the 18 bits of the clip code is "0", the second step is performed, referring to the clip code, to detect the line of intersection between the plane and the view volume.

Thus, in the background art, preparation for generation of the clip code, i.e., comparison in position between the vertices and the planes constituting the view volume, and generation of the clip code based on the comparison result are performed in software, disadvantageously requiring a very long operation time.

SUMMARY OF THE INVENTION

The present invention is directed to a clipping device for presenting an object to be displayed in a display area constituted of N pairs of boundaries perpendicular to N axes orthogonal to one another at the point of origin, each of the N pairs of boundaries being opposed to each other with the point of origin interposed therebetween. According to a first aspect of the present invention, the clipping device comprises: at least one operation portion for performing an operation which includes subtraction and addition of an absolute value of the coordinate of one of the N pairs of boundaries in the display area from and to the coordinate of a vertex which is a constituent of the object to be displayed with respect to one of the N axes in response to whether a function signal has a first value or a second value and outputting a first signal which is activated when a result of the operation is not more than zero and a second signal which is activated when the result of the operation is not less than zero; a plurality of first kind of registers for storing the first signal on an axis basis when the function signal has the first value; and a plurality of second kind of registers for storing the second signal on an axis basis when the function signal has the second value.

According to a second aspect of the present invention, in the clipping device of the first aspect, the at least one operation portion includes a plurality of operation portions, and the plurality of operation portions are provided correspondingly to the N axes and each obtain the first signal and the second signal with respect to corresponding one of the N axes for the vertex at the specified time.

According to a third aspect of the present invention, the clipping device of the second aspect further comprises: a gate for obtaining a logical product of all values stored in the plurality of first kind of registers and the plurality of second kind of registers.

According to a fourth aspect of the present invention, the clipping device of the first aspect further comprises: a first gate for obtaining a logical product of all values stored in the plurality of first kind of registers and the plurality of second kind of registers.

According to a fifth aspect of the present invention, the clipping device of the fourth aspect further comprises: N latches for storing outputs from the first gate which are sequentially shifted therein.

According to a sixth aspect of the present invention, the clipping device of the first aspect further comprises: N latches for storing all values stored in the plurality of first kind of registers and the plurality of second kind of registers which are sequentially shifted therein; and 2N intersection check circuits for inputting values stored in the N latches in units of values stored in one of the plurality of first registers and the plurality of second registers as a group of input data, and each of the 2N intersection check circuits outputs an exclusive logical sum of data constituting the group of input data which are inputted therein.

According to a seventh aspect of the present invention, in the clipping device of the sixth aspect, N is three, and each of the 2N intersection check circuits has a first gate for obtaining an exclusive logical sum of two of the data constituting the group of input data; a second gate for obtaining a logical product of three of the data constituting the group of input data; a third gate for obtaining a logical sum of three of the data constituting the group of input data; a fourth gate for obtaining an exclusive logical sum of an output from the second gate and an output from the third gate; and a selector for selectively outputting an output from the first gate and an output from the fourth gate.

According to an eighth aspect of the present invention, in the clipping device of the first aspect, N is three, and the clipping device further comprises: a judgment signal generation unit having a first gate for obtaining a logical product of values stored in a first one of the plurality of first kind of registers, a second one of the plurality of first kind of registers, a first one of the plurality of second kind of registers and a second one of the plurality of second kind of registers; a second gate for obtaining a logical product of an output from the first gate and values stored in a third one of the plurality of first kind of registers and a third one of the plurality of second kind of registers; and a selector for selectively outputting the output from the first gate and an output from the second gate.

In the clipping device of the first aspect, the first and second signals each indicating a positional relation between the coordinate of the vertex and the coordinate of the boundary of the display area, which are obtained by the operation in accordance with the function signal, are stored separately into the plurality of registers based on the function signal. Therefore, through the control based on the function signal, the clip code can be quickly achieved from the data separately stored in the plurality of registers.

The clipping device of the second aspect eliminates the need for performing separate operations by coordinate and simplifies the control over the first kind of registers and the second kind of registers.

The clipping device of the third aspect and the clipping device of the fourth aspect each allow quick judgment in hardware on whether the bits of the clip code have the same values or not, and in other words, whether the object to be displayed exists within or beyond the display area.

The clipping device of the fifth aspect performs parallel operations for N vertices constituting the object to be displayed, to facilitate the judgment on whether the object to be displayed exists within or beyond the display area.

In the clipping device of the sixth aspect, the intersection check circuits are provided correspondingly to the boundaries of the display area. It can be judged by obtaining the exclusive logical sum which boundary is interposed between each pair of the vertices constituting the object to be displayed. Therefore, the boundary at which the object to be displayed and the display area intersect can be quickly obtained.

In the clipping device of the seventh aspect, which boundary of the display area intersects the object to be displayed is judged by the first gate when the object to be displayed is line and by the fourth gate when the object to be displayed is triangle.

The clipping device of the eighth aspect allows judgment on whether the object to be displayed exists within or beyond the display area in both cases of 2D display area and 3D display area.

An object of the present invention is to provide a technique of performing the first step of the clipping, i.e., judgment on whether the primitive exists within or beyond the view volume in hardware, to achieve faster generation of the clip code. Another object of the present invention is to provide a technique of quick detecting whether the primitive intersects each of the planes constituting of the view volume or not.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a circuit diagram showing a configuration of a control unit 21a;

DESCRIPTION OF THE PREFERRED EMBODIMENTS

The First Preferred Embodiment

Figure 1:
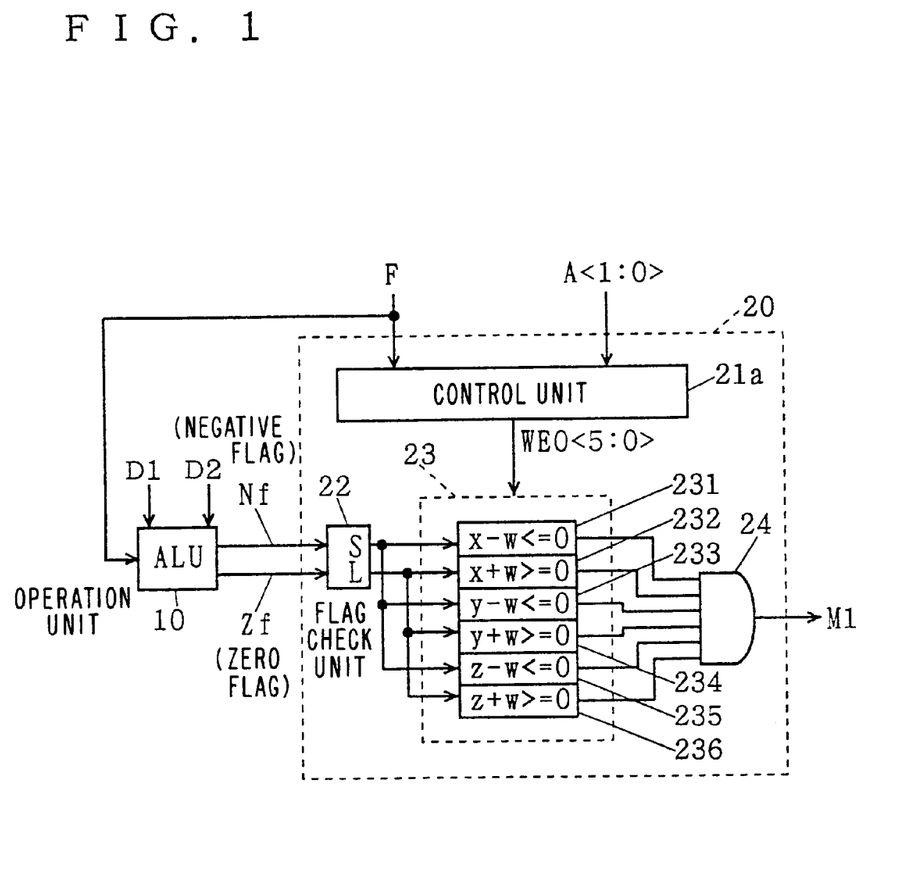
FIG. 1 is a circuit diagram showing a configuration of a clip judgment device in accordance with a first preferred embodiment of the present invention.

FIG. 1 is a circuit diagram showing a configuration of a clip judgment device in accordance with the first preferred embodiment of the present invention. An operation unit (referred to as "ALU" hereinafter) 10 has an addition/subtraction function, and is supplied with the coordinate of a vertex which is a primitive or one of those constituting the primitive as one input D1 and an absolute value w of the coordinate of one of planes constituting a view volume as the other input D2. The ALU 10 is also supplied with a function signal F, and performs addition or subtraction of the value of the input D2 to or from the value of the input D1 in response to the value of the function signal F, "1" or "0", respectively.

In this present invention, a view volume is constituted of yz-planes, zx-planes, xy-planes which are perpendicular to the x-axis, the y-axis and the z-axis, respectively. For example, the x-coordinates of a pair of yz-planes are expressed as P0 and −P1, the y-coordinates of a pair of zx-planes as Q0 and −Q1, and the z-coordinates of a pair of xy-planes as R0 and −R1 (P0, P1, Q0, Q1, R0 and R1 are positive numbers). If the coordinate of the vertex V0 is (x0, y0, z0), the 6 bits of clip code V0c of the vertex V0 are obtained as ① x0−P0, ② x0+P1, ③ y0−Q0, ④ y0+Q1, ⑤ z0−R0 and ⑥ z0+R1. In other words, in the operations ① to ⑥, the absolute values w are P0, P1, Q0, Q1, R0 and R1, respectively.

Further, when the function signal F is "0", the operations ①, ③ and ⑤ are performed, and when the function signal F is "1", the operations ②, ④ and ⑥ are performed.

The ALU 10 outputs a zero flag Zf indicating that the operation result is zero and a negative flag Nf indicating that the operation result is negative number, instead of addition or subtraction result value. This pair of flags are given to a check unit 22 included in a clip-code generation/judgment unit 20.

Figure 2:
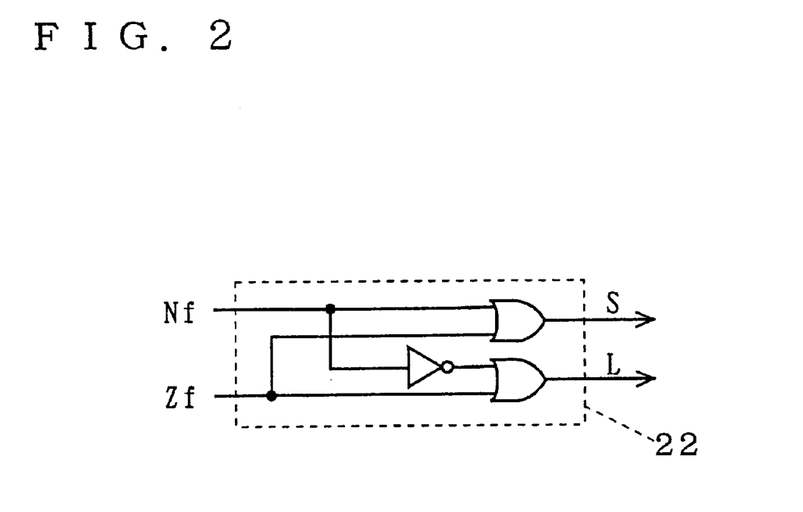
FIG. 2 is a circuit diagram showing a configuration of a flag check unit 22.

FIG. 2 is a circuit diagram showing a configuration of the flag check unit 22. The flag check unit 22 outputs a logical sum of the zero flag Zf and the negative flag Nf as an output S and a logical sum of the logical inversion of the negative flag, Nf and the zero flag Zf as an output L. The output S is "1" when each of the results of the operations ① to ⑥ is zero or negative number and "0" when positive number. The output L is "1" when each of the results of the operations ① to ⑥ is zero or positive number and "0" when negative number. The outputs S and L are given to a group of registers 23.

The group of registers 23 has six registers 231 to 236, and the registers 231, 233 and 235 receives the output S and the registers 232, 234 and 236 receives the output L. It depends on a 6-bit write enable signal WE0 <5:0> whether the outputs S and L should be written into the registers 231 to 236 or not. More specifically, the write enable signals WE0 <0> to <5> enable writing of the outputs S and L into the registers 231 to 236, respectively.

The write enable signal WE0 <5:0> is generated by a control unit 21a based on the function signal F and a 2-bit axis signal A <1:0>. The axis signal A <1:0> has a value of "01", "10" or "11" representing the x-axis, the y-axis or the z-axis, respectively. In other words, the above operations ① and ② are associated with the axis signal A <1:0> of "01", the operations ③ and ④ are associated with the axis signal A <1:0> of "10" and the operations ⑤ and ⑥ are associated with the axis signal A <1:0> of "11".

Figure 3:
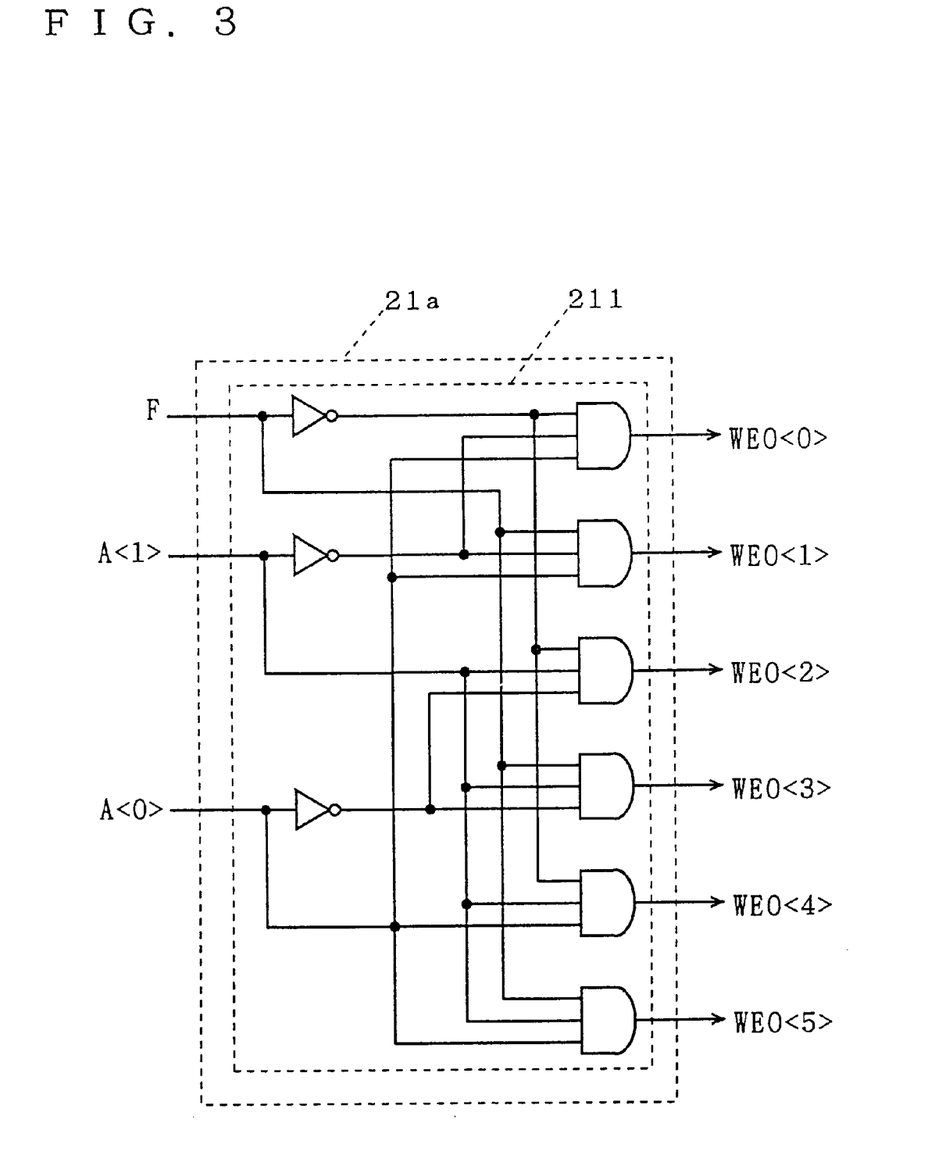

FIG. 3 is a circuit diagram showing a configuration of the control unit 21a. The control circuit 21a of the first preferred embodiment has only a write enable decoder 211 and generates the write enable signal WE0 <5:0> in accordance with the following theory: A logical product of the logical inversion of the function signal F, the logical inversion of the axis signal A <1> and the axis signal A <0> is obtained as the write enable signal WE0 <0>, a logical product of the function signal F, the logical inversion of the axis signal A <1> and the axis signal A <0> is obtained as the write enable signal WE0 <1>, a logical product of the logical inversion of the function signal F, the axis signal A <1> and the logical inversion of the axis signal A <0> is obtained as the write enable signal WE0 <2>, a logical product of the function signal F, the axis signal A <1> and the logical inversion of the axis signal A <0> is obtained as the write enable signal WE0 <3>, a logical product of the logical inversion of the function signal F, the axis signal A <1> and the axis signal A <0> is obtained as the write enable signal WE0 <4>, and a logical product of the function signal F, the axis signal A <1> and the axis signal A <0> is obtained as the write enable signal WE0 <5>.

Since writing of the outputs S and L from the flag check unit 22 into the registers 231 to 236 is enabled according to the write enable signal WE0 <5:0> thus obtained, the registers 231, 233 and 235 store "1" when the results of the operations ①, ③ and ⑤ are negative number or zero and store "0" when positive number, respectively, and the registers 232, 234 and 236 store "1" when the results of the operations ②, ④ and ⑥ are positive number or zero and store "0" when negative number, respectively, Considering that the ranges of x0, y0 and z0 for the vertex V0 to be within the view volume should be −P1≦x0≦P0, −Q1≦y0≦Q0, −R1≦z0≦R0, together with the above condition for storing the operation results in the registers, the vertex V0 exists within the view volume when the values in the registers 231 to 236 are all "1". In other words, it is only necessary to judge whether the values in the registers 231 to 236 are all "1" or not in order to check if the vertex V0 is within the view volume. To meet this requirement, the clip-code generation/judgment unit 20 has a 6-input AND gate 24 which outputs a logical product of the values in the registers 231 to 236 as a judgment signal M1. If the judgment signal M1 is "0", the vertex V0 is beyond the view volume and the second and third steps for clipping will follow.

Thus, having a plurality of registers 231 to 236, the device of the first preferred embodiment divides the information based on a pair of flags to be stored in the registers 231 to 236 based on the function signal and the axis signal. That allows generation of the judgment signal M1 in hardware, improving the operating speed.

The Second Preferred Embodiment

The device of the first preferred embodiment, which has only one ALU 10, must sequentially supply the inputs D1 on x-, y- and z-coordinates of one vertex. If the device has three ALUs, the operations on the three coordinates of one vertex are performed at one time and therefore the operating speed can be improved.

Figure 4:
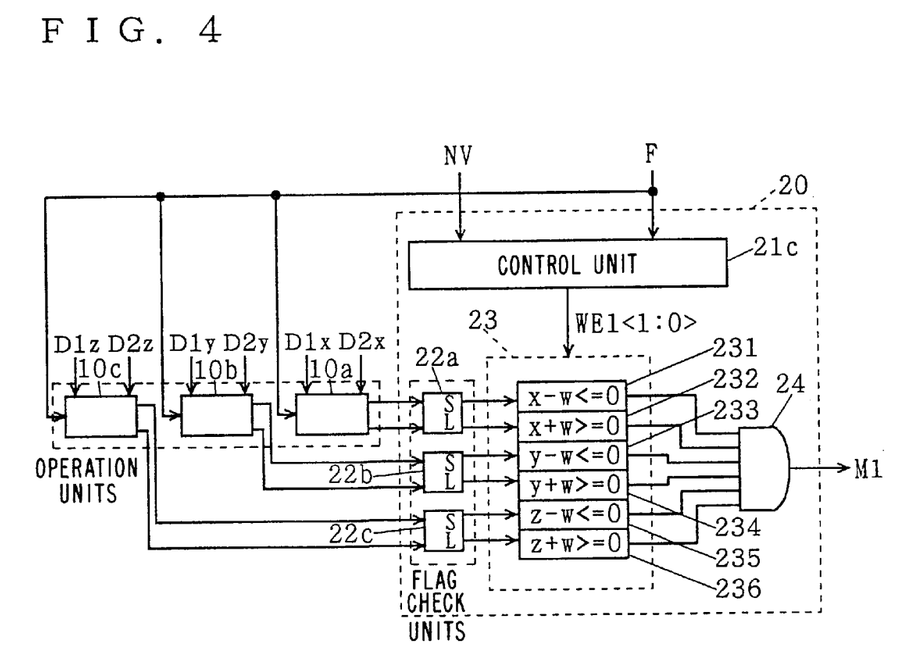
FIG. 4 is a circuit diagram showing a configuration of a clip judgment device in accordance with a second preferred embodiment of the present invention.

FIG. 4 is a circuit diagram showing a configuration of a clip judgment device in accordance with the second preferred embodiment of the present invention. In the device of the second preferred embodiment, the ALU 10 of the first preferred embodiment is replaced by ALUs 10a, 10b and 10c and the flag check unit 22 is replaced by flag check units 22a, 22b and 22c. In response to the replacements, the control unit 21a is replaced by a control unit 21c.

The ALU 10a is supplied with the x-coordinate of a vertex as an input D1x and an absolute value w of the coordinate of the yz-plane which is one of the planes constituting a view volume as the other input D2x. Similarly, the ALU 10b is supplied with the y-coordinate of the vertex as an input D1y and an absolute value w of the coordinate of the zx-plane which is one of the planes constituting the view volume as the other input D2y. The ALU 10c is supplied with the z-coordinate of the vertex as an input D1z and an absolute value w of the coordinate of the xy-plane which is one of the planes constituting the view volume as the other input D2z. Taking the same example as the first preferred embodiment, the absolute value w in the ALU 10a takes either P0 or P1, the absolute value w in the ALU 10b takes either Q0 or Q1 and the absolute value w in the ALU 10c takes either R0 or R1.

Each of the ALU 10a, ALU10b and ALU 10c is supplied with the function signal F and has an addition/subtraction function, like the ALU 10. Specifically, when the function signal F is "0", the operations ①, ③ and ⑤ are performed in the ALUs 10a, 10b and 10c, respectively, in parallel and when the function signal F is "1", the operations ②, ④ and ⑥ are performed in the ALUs 10a, 10b and 10c, respectively, in parallel. As a result, the ALUs 10a, 10b and 10c output the zero flags Zf and the negative flags Nf on the x-, y- and z-coordinates, respectively.

The flag check units 22a, 22b ad 22c are provided correspondingly to the ALUs 10a, 10b and 10c to perform the same operation as the flag check unit 22 does, based on the zero flags Zf and the negative flags Nf on the x-, y- and z-coordinates, respectively.

On the other hand, in order to store the outputs from the flag check units 22a, 22b and 22c into the group of registers 23, it is necessary to make a control different from the that of first preferred embodiment. Since the outputs S and L on the three coordinates are obtained in parallel and the operations ①, ③ and ⑤ or the operations ②, ④ and ⑥ are performed in parallel according to the function signal F, the outputs S and L are written at the same timing into the registers 231, 233 and 235 or the registers 232, 234 and 236. Accordingly, the write enable signal needs only 2 bits. In the second preferred embodiment, the write enable signal WE1 <1:0> is supplied from the control unit 21c.

It is desirable that the control unit 21c should generate the write enable signal WE1 <1:0> based on a vertex update signal NV which is activated every time when a vertex is sequentially given, as well as the function signal F. That's because the operations on a vertex should be performed in parallel.

Figure 5:
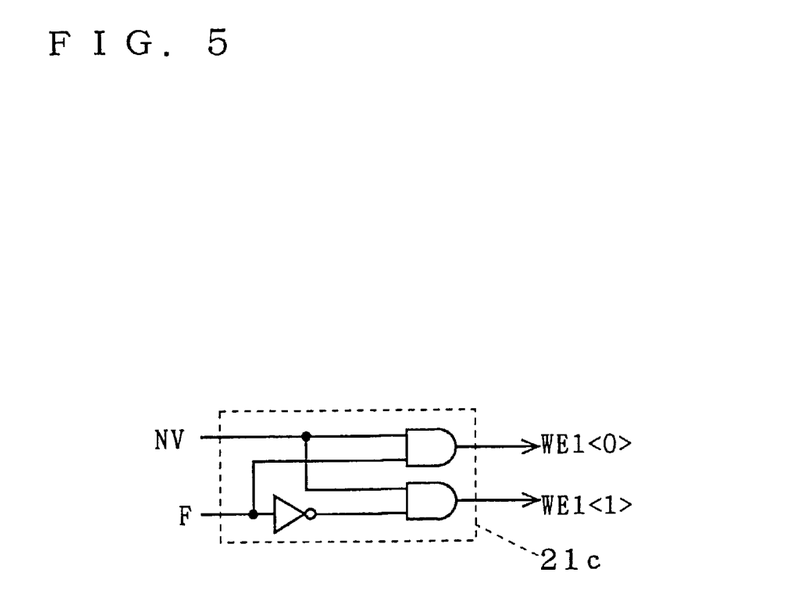
FIG. 5 is a circuit diagram showing a configuration of a control unit 21c.

FIG. 5 is a circuit diagram showing a configuration of the control unit 21c. Only when the vertex update signal NV is "1", the value of the function signal F is outputted as the write enable signal WE1 <0> and the logical inversion thereof is outputted as the write enable signal WE1 <1>. Therefore, the data stored in the registers 231 to 236 are exactly the same as those in the first preferred embodiment and the judgment signal M1 is the same as obtained in the first preferred embodiment.

Thus, the second preferred embodiment performs the parallel operations in hardware to enhance the effect of the first preferred embodiment, i.e., further improve the operating speed. Moreover, the configuration of the control unit 21c to obtain the write enable signal WE1 is simpler than that of the control unit 21 to obtain the write enable signal WE0, and in other words, the control over the group of registers 23 becomes simpler.

The Third Preferred Embodiment

In the first and second preferred embodiments, since judgment is made on whether each vertex exists within or beyond the view volume, the judgment signal M1 works as the judgment in the first step if the primitive is vertex, but if the primitive is line or polygon, the judgment signal M1 does not work by itself as the judgment in the first step. Therefore, when the primitive is line or polygon, it is necessary to obtain the judgment signals M1 on two or three vertices and judge whether the primitive is within or beyond the view volume based on the relation of the vertices in software and the like in addition to the judgment in hardware. The third preferred embodiment provides a configuration to achieve like result of the judgment in the first step for the clipping in hardware, even if the primitive is line or polygon.

Figure 6:
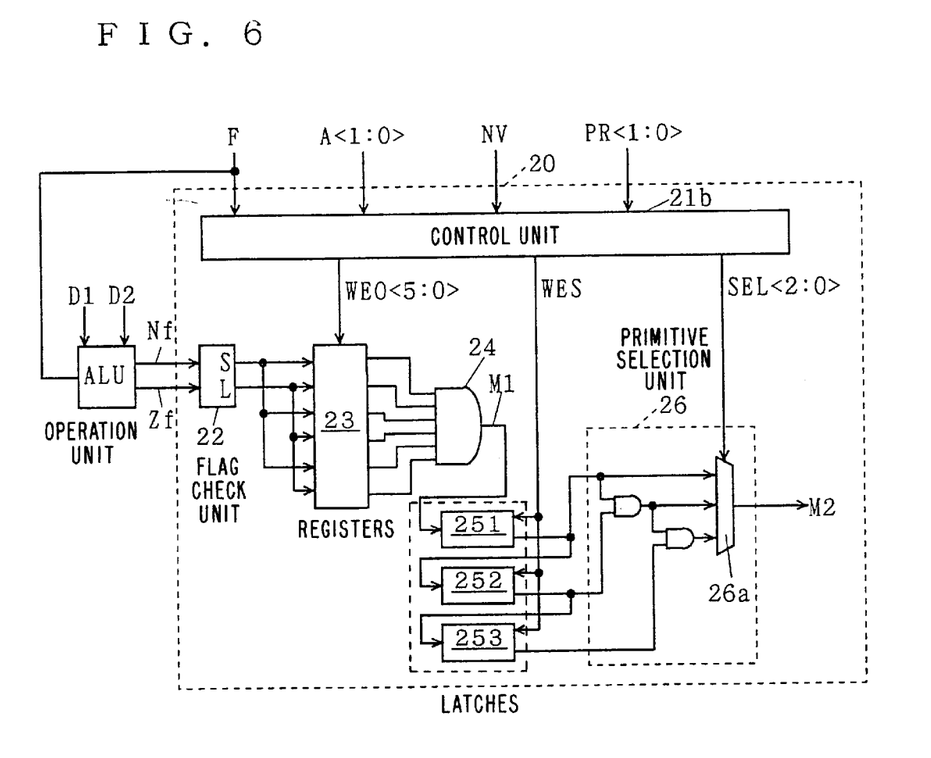
FIG. 6 is a circuit diagram showing a configuration of a clip judgment device in accordance with a third preferred embodiment of the present invention.

FIG. 6 is a circuit diagram showing a configuration of a clip judgment device in accordance with the third preferred embodiment of the present invention. In the third preferred embodiment, latches 251 to 253 and a primitive selection unit 26 are additionally provided to the clip-code generation/judgment unit 20 of the first preferred embodiment, and the control unit 21a is replaced by a control unit 21b in response to that additional provision.

The judgment signal M1 obtained in the same manner as the first preferred embodiment is inputted to the latch 251. The latches 251 to 253 are connected in series and a shift signal WES controls input/output of data. When the shift signal WES is activated, data stored in the latches 251 to 253 are shifted in this order.

Figure 7:
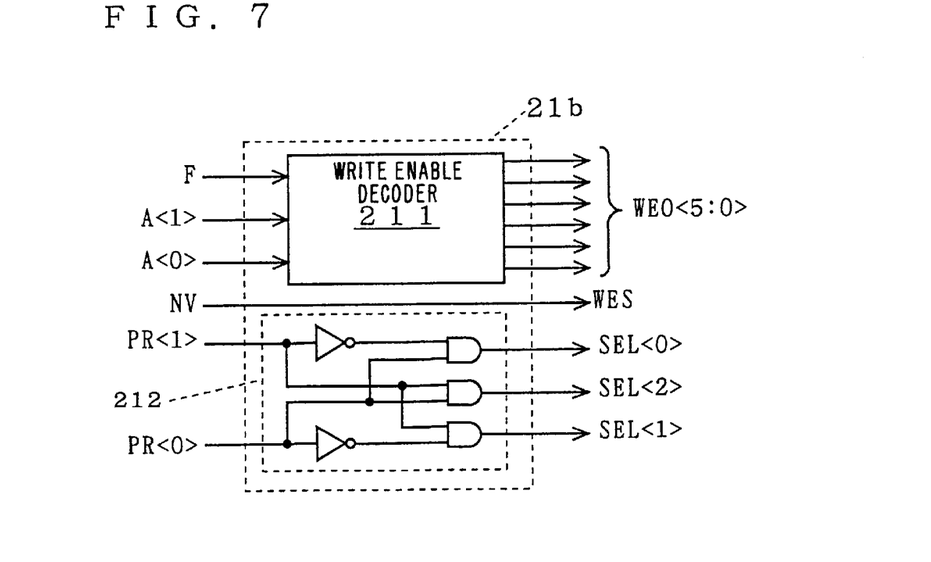
FIG. 7 is a circuit diagram showing a configuration of a control unit 21b.

FIG. 7 is a circuit diagram showing a configuration of the control unit 21b. The control unit 21b receives the vertex update signal NV which is activated every time when one of the vertices constituting the primitive as line or polygon is sequentially given and outputs it as the shift signal WES. In other words, the judgment signals M1 on the respective vertices constituting the primitive are sequentially stored in the latches 251 to 253.

The control unit 21b has a primitive decoder 212 as well as the write enable decoder 211. The write enable decoder 211 generates the write enable signal WE0 <5:0> based on the function signal F and the axis signal A <1:0>, controlling the group of registers 23, like the first preferred embodiment. On the other hand, the primitive decoder 212 generates a 3-bit selection control signal SEL <2:0> based on a 2-bit primitive specifying signal PR <1:0> which specifies the kind of primitive. For example, if the primitive specifying signal PR <1:0> is "01", "10" or "11" when the primitive is vertex, line or polygon, respectively, the selection control signal SEL <2:0> is "001", "010" or "100". For example, the logical product of the logical inversion of the primitive specifying signal PR <1> and the primitive specifying signal PR <0> is obtained as the selection control signal SEL <0>, the logical product of the primitive specifying signal PR <1> and the primitive specifying signal PR <0> is obtained as the selection control signal SEL <2>, and the logical product of the primitive specifying signal PR <1> and the logical inversion of the primitive specifying signal PR <0> is obtained as the selection control signal SEL <1>.

The primitive selection unit 26 has a selector 26a, outputting one of three inputs as a judgment signal M2 in accordance with the selection control signal SEL. The three inputs are the value stored in the latch 251, the logical product of the values stored in the latches 251 and 252 and the logical product of the values stored in the latches 251 to 253, and indicate the judgment results on whether the primitive is within or beyond the view volume when the primitive is vertex, line and polygon, respectively. Since the selector 26a is controlled by the selection control signal SEL <2:0> which takes different values depending on the kind of the primitive, i.e., vertex, line or polygon, the judgment signal M2 indicate the result of judgment on whether the primitive is within or beyond the view volume, regardless of the kind of primitive.

It is sure that the selector 26a which is controlled by the 2-bit primitive specifying signal PR <1:0> itself may be used. In this case, there is no need for the primitive decoder 212.

Figure 8:
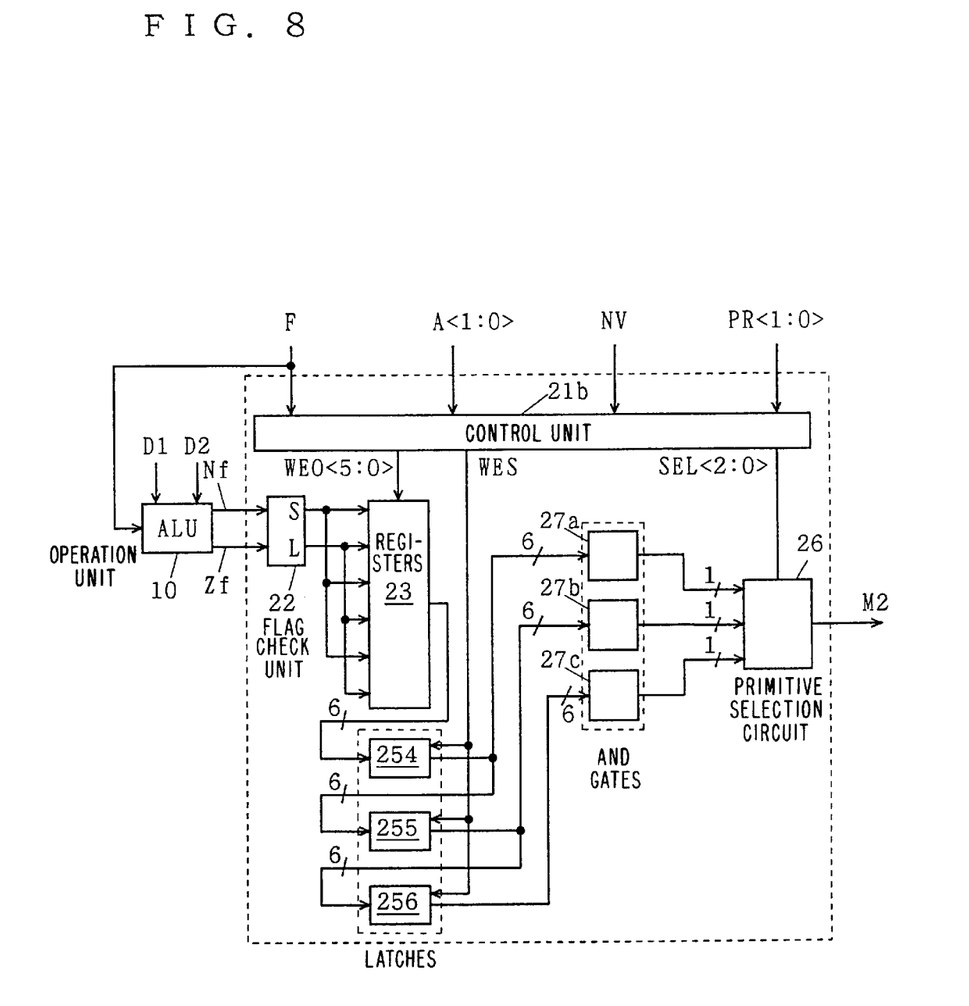
FIG. 8 is a circuit diagram showing a modification of the third preferred embodiment of the present invention.

FIG. 8 is a circuit diagram showing a modification of the third preferred embodiment of the present invention. Without provision of the 6-input AND gate 24, the 6-bit output from the group of registers 23 is inputted to a 6-bit latch 254.

From the latch 254 to the latch 256, data to be stored therein are shifted according to the shift signal WES, like the latches 251 to 253. Six-input AND gates 27a to 27c obtain the logical products of the values stored in the latches 254 to 256, respectively, and each output 1-bit signal to the primitive selection unit 26. Unlike the first preferred embodiment, the above configuration may be adopted since the judgment signal M1 is not necessarily needed.

Though the third preferred embodiment has been discussed as compared with the first preferred embodiment, the modification of this preferred embodiment, in which the elements to process the outputs from the group of registers 23 or the judgment signal M1 which is the logical product thereof are additionally provided, surely applies to the second preferred embodiment.

The Fourth Preferred Embodiment

Figure 9:
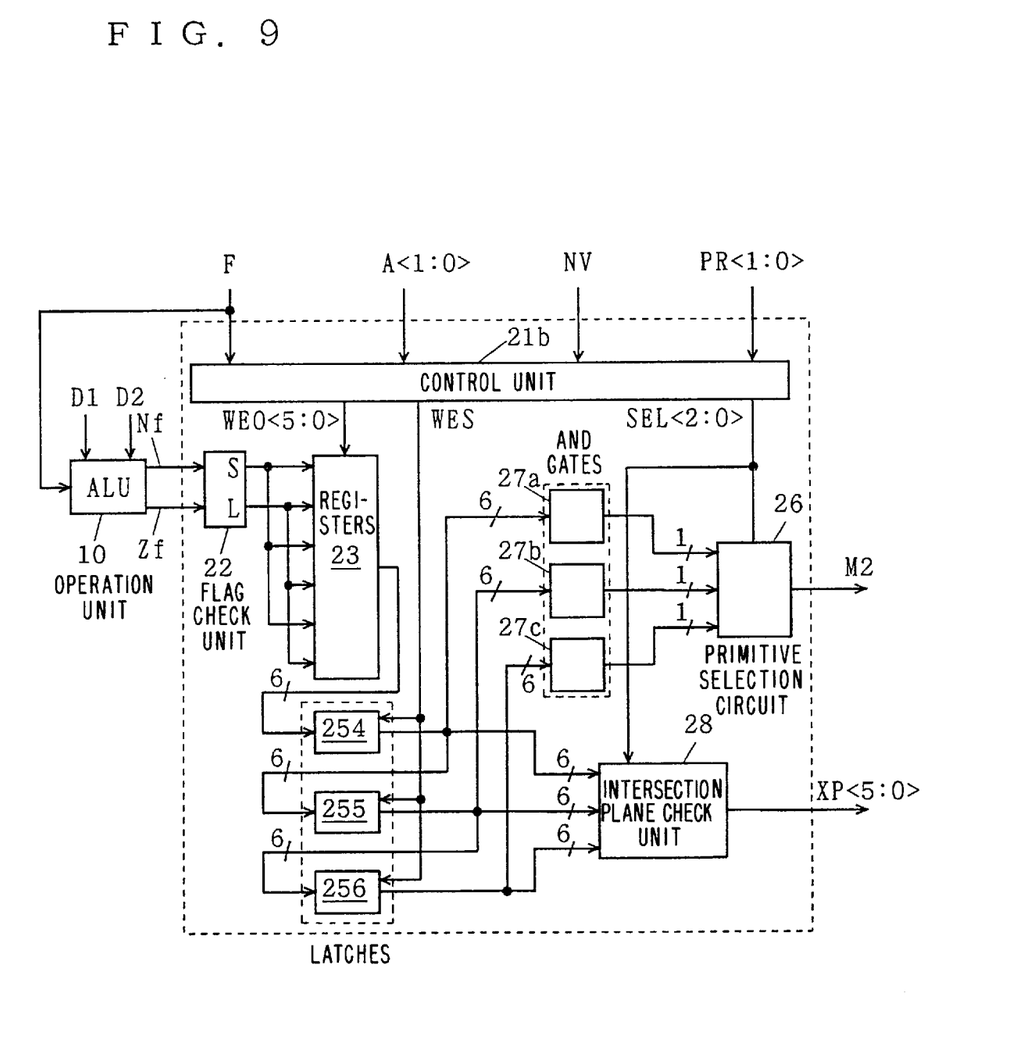
FIG. 9 is a circuit diagram showing a configuration of a clip judgment device in accordance with a fourth preferred embodiment of the present invention.

The configuration of FIG. 8 which is a modification of the third preferred embodiment may be further modified by additionally providing an element, to produce another effect. FIG. 9 is a circuit diagram showing a configuration of a clip judgment device in accordance with the fourth preferred embodiment of the present invention. A intersection-plane check unit 28 is additionally provided to the configuration of FIG. 8. The intersection-plane check unit 28 receives the outputs from the latches 254 to 256 and outputs intersection-plane data XP <5:0> representing a plane which intersects the primitive.

Figure 10:
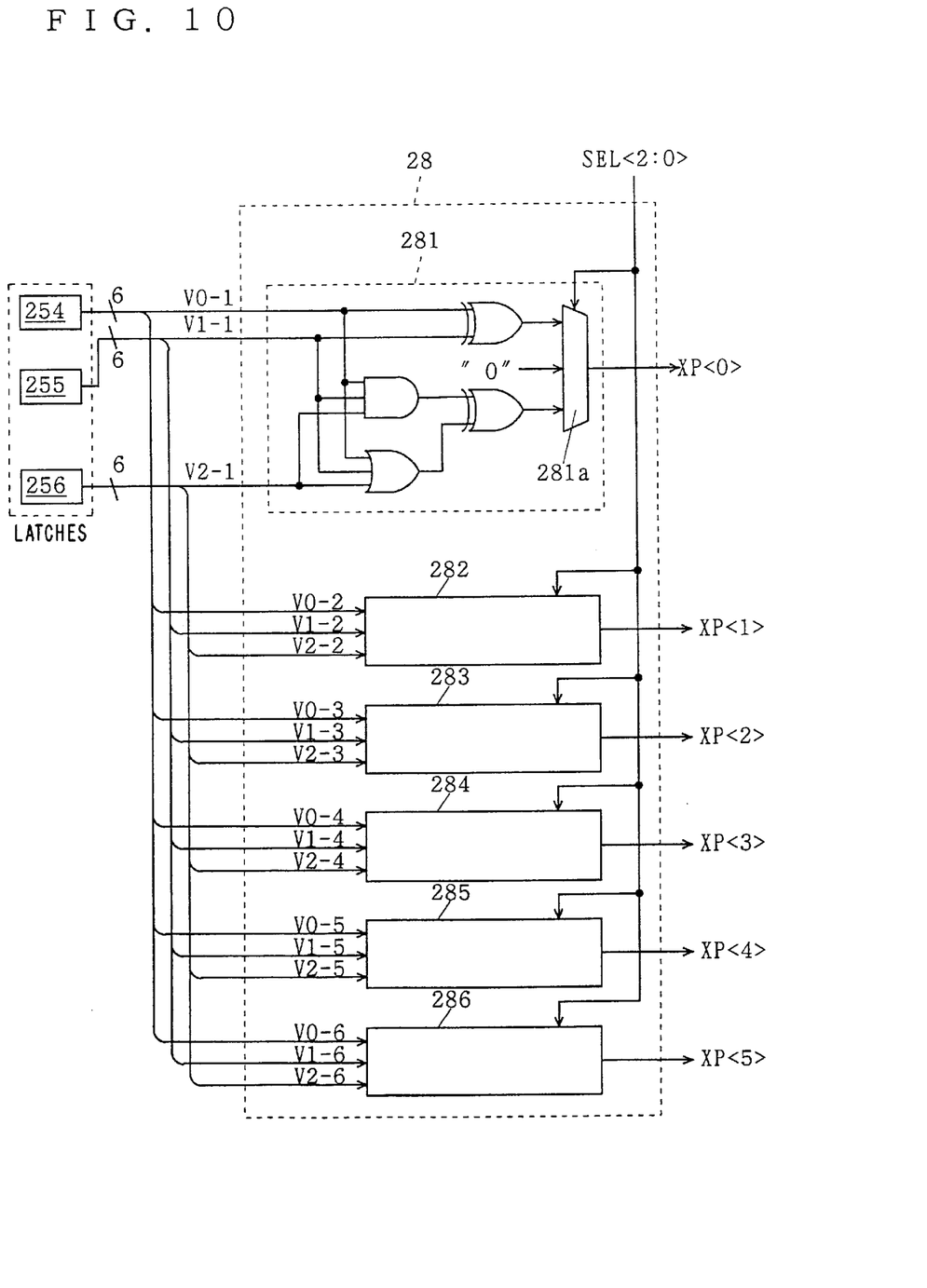
FIG. 10 is a circuit diagram showing a configuration of an intersection-plane check unit 28.

FIG. 10 is a circuit diagram showing a configuration of the intersection-plane check unit 28. The intersection-plane check unit 28 includes intersection check circuits 281 to 286 which have the same configuration. The data corresponding to the respective registers 231 to 236 (i.e., the operations ① to ⑥) are inputted to the intersection check circuits 281 to 286, respectively, in units of data on the three vertices. In FIG. 10, a reference sign Vi-j (i=0, 1, 2; j=0, 1, 2, 3, 4, 5, 6) represents the result of the operation (j) on the vertex Vi. For example, the reference sign V2-3 represents the result of the operation ③ on the vertex V2. Herein, "the result of the operation" refers to the data to be given to the group of registers 23.

The intersection check circuit 281 receives the result of the operation ① on the vertices V0, V1 and V2 and results of three kinds of logical operations as discussed below are inputted to a selector 281a. The selector 281a outputs one of the results of the three kinds of logical operations in accordance with the 3-bit selection control signal SEL <2:0>.

If the primitive is vertex, the selection control signal SEL <2:0> is "001" as discussed in the third preferred embodiment. The selector 281a outputs a first logical operation result, which is "0" regardless of the values of the data V0-1, V1-1 and V2-1 as the intersection-plane data XP <0>. That's because the primitive intersects no plane if it is vertex.

If the primitive is line, the primitive line intersects one of the planes constituting the view volume when the two vertices of endpoints are opposed with the plane interposed therebetween. In other words, when the respective bits for the plane in the clip codes of the two vertices are different from each other, it is judged that the plane is an intersection plane. Therefore, the exclusive logical sum of the data V0-1 and V1-1 is obtained as a second logical operation result, and the selector 281a outputs it as the intersection-plane data XP <0> when the selection control signal SEL <2:0> is "010".

If the primitive is polygon, when one vertex and another one vertex are opposed with one of the planes constituting the view volume interposed therebetween, the plane is an intersection plane. In other words, when at least one of the vertices has a clip code including a bit of "1" for the plane in the clip code and at least one of the others has a clip code including a bit of "0" for the plane in the clip code, the plane is an intersection plane. Therefore, the exclusive logical sum of the logical product and the logical sum of the data V0-1, V1-1 and V1-2 is obtained as a third logical operation result, and the selector 281a outputs it as the intersection-plane data XP <0> when the selection control signal SEL <2:0> is "100".

With the above configuration, operating as above, the intersection check circuit 281 judges whether the primitive constituted of the vertices V0, V1 and V2 intersects the yz-plane (x=P0) or not by whether the intersection-plane data XP <0> is "1" or "0". Through the same operation, the other intersection check circuits 282 to 286 can judge whether or not the primitive intersects the yz-plane (X=−P1), the zx-planes (y=Q0, y=−Q1) and the xy-planes (z=R0, z=−R1), respectively. Therefore, with the intersection-plane data XP <5:0>, it is possible to judge in parallel whether each of the six planes constituting the view volume is an intersection plane for a given primitive or not.

Thus, the fourth preferred embodiment can perform the parallel operations for detecting an intersection plane in hardware, to thereby obtain the intersection plane more quickly.

The Fifth Preferred Embodiment

Though the clipping of a primitive against the view volume in 3D graphics display has been discussed in the first to fourth preferred embodiments, these preferred embodiments can surely apply to the clipping of the primitive against a window in 2D graphics display. For example, against a window which does not spread in the z-axis direction, there is no need for the clipping against the xy-plane and accordingly the registers 235 and 236 and the ALU 10c are not needed.

However, if the clipping of a primitive is required against both a view volume in 3D graphics display and a window in 2D graphics display, it is impossible to omit the registers 235 and 236 and the ALU 10c. Thus, it is desirable to selectively use the outputs from the registers 235 and 236 and the ALU 10c depending on whether the view volume or the window is used in the graphics system. Such an aspect will be discussed in the fifth preferred embodiment.

Figure 11:
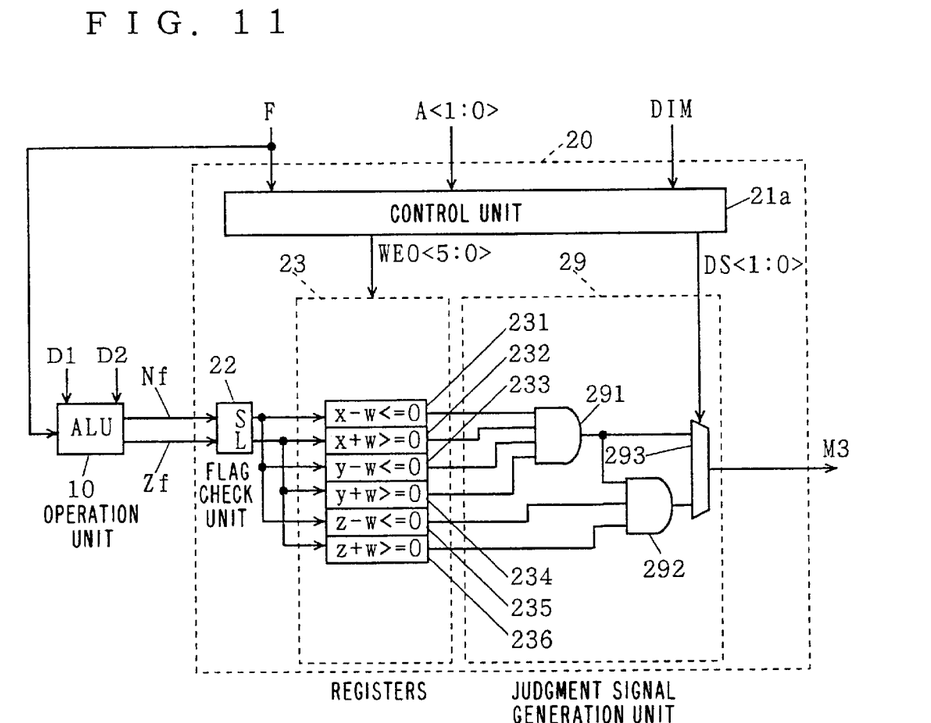
FIG. 11 is a circuit diagram showing a configuration of a clip judgment device in accordance with a fifth preferred embodiment of the present invention.

FIG. 11 is a circuit diagram showing a configuration of a clip judgment device in accordance with the fifth preferred embodiment of the present invention. In this configuration, the 6-input AND gate 24 and the control unit 21a in the clip judgment device of the first preferred embodiment are replaced by a judgment signal generation unit 29 and a control unit 21d, respectively.

The judgment signal generation unit 29 is supplied with the outputs from the group of registers 23 and a 2-bit selection signal DS <1:0> from the control unit 21d, and generates a judgment signal M3. The judgment signal generation unit 29 has a 4-input AND gate 291, a 3-input AND gate 292 and a selector 293. The selector 293 outputs the output from the AND gate 291 or 292 when the selection signal DS <1:0> is "01" or "10", respectively.

The 4-input AND gate 291 outputs the logical product of the data stored in the registers 231 to 234, and the 3-input AND gate 292 outputs the logical product of the output from the 4-input AND gate 291 and the data stored in the registers 235 and 236, i.e., the logical product of the data stored in the registers 231 to 236. Specifically, the 4-input AND gate 291 judges whether a vertex exists within or beyond a window and the 3-input AND gate 292 judges whether the vertex exists within or beyond a view volume. In other words, the output from the 3-input AND gate 292 is the judgment signal M1 of the first preferred embodiment.

Figure 12:
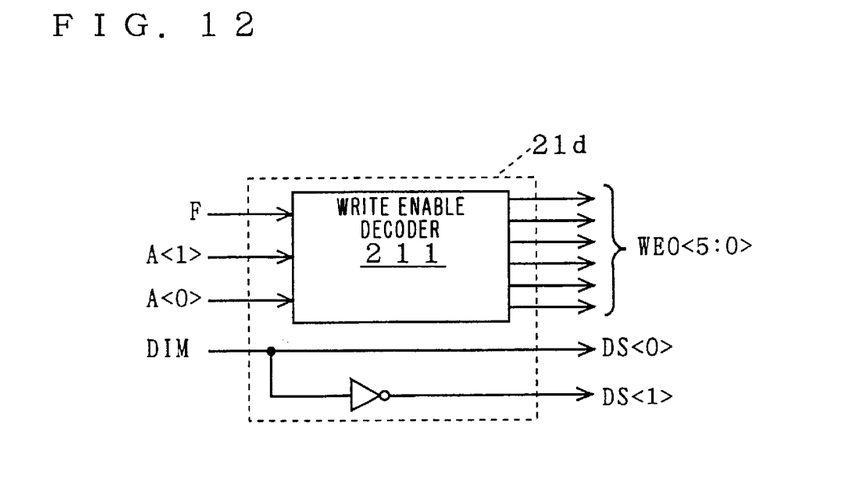
FIG. 12 is a circuit diagram showing a configuration of a control unit 21d.

FIG. 12 is a circuit diagram showing a configuration of the control unit 21d. The control unit 21d includes the write enable decoder 211 as discussed in the first preferred embodiment and an inverter. The write enable decoder 211 of this preferred embodiment performs the same operation as that of the first preferred embodiment, giving the 6-bit write enable signal WE0 <5:0> to the group of registers 23. On the other hand, the control unit 21d receives a dimension selection signal DIS, and generates a selection signal DS <1> which is an inverted version of the dimension selection signal DIS through the inverter and a selection signal DS <0> which is the dimension selection signal DIS without being inverted. Therefore, if the dimension selection signal DIS is set to take "0" or "1" depending on whether the view volume or the window is adopted in the graphics system respectively, the selection signal DS <1:0> takes "10" or "01" and the selector 293 outputs the logical product of the four bits of the clip code or six bits of the clip code as the judgment signal M3.

Thus, the fifth preferred embodiment can provide a judgment signal responsive to whether the view volume or the window is adopted in the graphics system. If the selector 293 has a function to selectively output the outputs from the gates 291 and 292 in response to the two values of the 1-bit signal, it is sure that the dimension selection signal DIS can be used to control the selector 293 and the control unit 21d may be replaced by the control unit 21a.

While the invention has been shown and described in detail, the foregoing description is in all aspects illustrative and not restrictive. It is therefore understood that numerous modifications and variations can be devised without departing from the scope of the invention.

We claim:

1. A clipping device for presenting an object to be displaced in a display area constituted of N pairs of boundaries perpendicular to N axes orthogonal to one another at the point of origin, each of said N pairs of boundaries being opposed to each other with said point of origin interposed therebetween, said clipping device comprising:

at least one operation portion for performing an operation which includes subtraction and addition of an absolute value of the coordinate of one of said N pairs of boundaries in said display area from and to the coordinate of a vertex which is a constituent of said object to be displayed with respect to one of said N axes in response to whether a function signal has a first value or a second value and outputting a first signal which is activated when a result of said operation is not more than zero and a second signal which is activated when said result of said operation is not less than zero;

a plurality of first registers for storing said first signal on an axis basis when said function signal has said first value; and a plurality of second registers for storing said second signal on an axis basis when said function signal has said second value.

2. The clipping device of claim 1, wherein said function signal has the first value or said second value when said coordinate of said one of said N pairs of boundaries is positive or negative, respectively.

3. The clipping device of claim 1, wherein said at least one operation portion has an operation unit for outputting a zero flag which is activated when said result of said operation is zero and a negative flag which is activated when said result of said operation is negative number, and a flag check unit for activating said first signal in response to activation of either said zero flag or said negative flag and activating said second signal in response to non-activation of said zero flag or activation of said negative flag.

4. The clipping device of claim 1, wherein said first value and said second value are complementary to each other, said-N is three, an axis signal indicating one of said N axes is made of two bits, said first signal and said second signal are separately stored in said plurality of first registers and said plurality of second registers in accordance with a write enable signal, said write enable signal being constituted of a zero-th bit being a logical product of the logical inversion of said function signal, a zero-th bit of said axis signal and the logical inversion of a first bit of said axis signal, a first bit being a logical product of said function signal, said zero-th bit of said axis signal and the logical inversion of said first bit of said axis signal, a second bit being a logical product of the logical inversion of said function signal, the logical inversion of said zero-th bit of said axis signal and the logical inversion of said first bit of said axis signal, a third bit being a logical product of said function signal, the logical inversion of said zero-th bit of said axis signal and the logical inversion of said first bit of said axis signal, a fourth bit being a logical product of the logical inversion of said function signal, said zero-th bit of said axis signal and said first bit of said axis signal, and a fifth bit being a logical product of said function signal, said zero-th bit of said axis signal and said first bit of said axis signal.

5. The clipping device of claim 1, wherein said at least one operation portion includes a plurality of operation portions, said plurality of operation portions are provided correspondingly to said N axes, and each obtain said first signal and said second signal with respect to corresponding one of said N axes for said vertex at the specified time.

6. The clipping device of claim 5, wherein said first value and said second value are complementary to each other, said first signal and said second signals are separately stored in said plurality of first registers and said plurality of second registers in accordance with a write enable signal, said write enable signal being constituted of a zero-th bit being a logical product of a vertex update signal which is activated every time when said vertex is updated and said function signal, and a first bit being a logical product of said vertex update signal and the logical inversion of said function signal.

7. The clipping device of claim 5, further comprising:

a gate for obtaining a logical product of all values stored in said plurality of first registers and said plurality of second registers.

8. The clipping device of claim 1, further comprising:

a first gate for obtaining a logical product of all values stored in said plurality of first registers and said plurality of second registers.

9. The clipping device of claim 8, further comprising:

N latches for storing outputs from said first gate which are sequentially shifted therein.

10. The clipping device of claim 9, further comprising:

a second gate for outputting a logical product of values stored in M of said N latches (M: integer, 1<M<N+1).

11. The clipping device of claim 1, further comprising:

N latches for storing all values stored in said plurality of first registers and said plurality of second registers which are sequentially shifted therein; and 2N intersection check circuits for inputting values stored in said N latches in units of values stored in one of said plurality of first registers and said plurality of second resisters as a group of input data, wherein each of said 2N intersection check circuits outputs an exclusive logical sum of data constituting said group of input data which are inputted therein.

12. The clipping device of claim 11, further comprising:

N gates for each obtaining a logical product of said value stored in corresponding one of said N latches.

13. The clipping device of claim 12, wherein a gate for outputting a logical product of values stored in M of said N latches (M: integer, 1<M<N+1).

14. The clipping device of claim 11, wherein

N is three, and each of said 2N intersection check circuits has a first gate for obtaining an exclusive logical sum of two of said data constituting said group of input data;

a second gate for obtaining a logical product of three of said data constituting said group of input data;

a third gate for obtaining a logical sum of three of said data constituting said group of input data;

a fourth gate for obtaining an exclusive logical sum of an output from said second gate and an output from said third gate; and a selector for selectively outputting an output from said first gate and an output from said fourth gate.

15. The clipping device of claim 14, wherein said selector outputs "0" when said object to be displayed is a vertex, regardless of values of said outputs from said first and fourth gates.

16. The clipping device of claim 14, further comprising:

a fifth gate for outputting a logical product of values stored in M of said N latches (M: integer, 1<M<N+1).

17. The clipping device of claim 1, wherein

N is three, said clipping device further comprising:

a judgment signal generation unit having a first gate for obtaining a logical product of values stored in a first one of said plurality of first registers, a second one of said plurality of first registers, a first one of said plurality of second registers and a second one of said plurality of second registers;

a second gate for obtaining a logical product of an output from said first gate and values stored in a third one of said plurality of first registers and a third one of said plurality of second registers; and a selector for selectively outputting said output from said first gate and an output from said second gate.

* * * * *